March 12, 1929.                L. LEVY                1,705,412
                       RADIO RECEIVING SYSTEM
                       Filed Nov. 9, 1925        2 Sheets-Sheet 1

Inventor
L. Levy
by Langner, Parry, Card & Langner
Attys

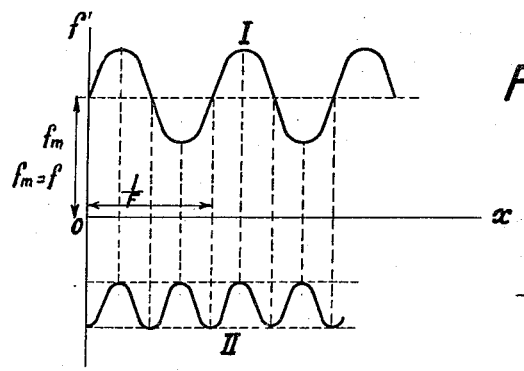
Fig. 3
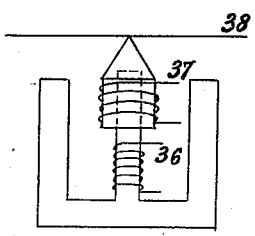
Fig. 7
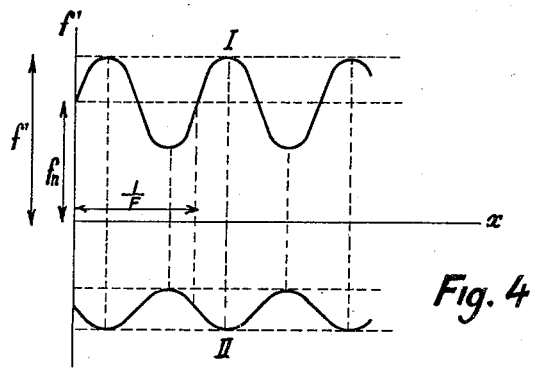
Fig. 4
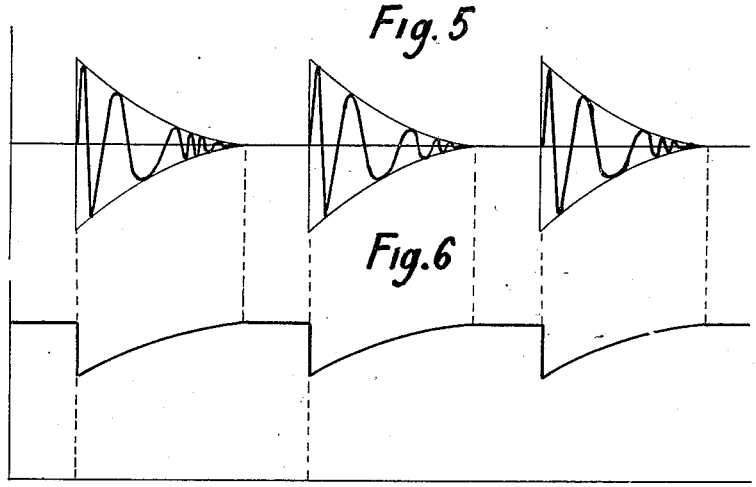
Fig. 5
Fig. 6

Patented Mar. 12, 1929.

1,705,412

UNITED STATES PATENT OFFICE.

LUCIEN LEVY, OF PARIS, FRANCE.

RADIO RECEIVING SYSTEM.

Application filed November 9, 1925, Serial No. 67,961, and in France November 15, 1924.

The receiving stations for electric transmissions at high frequency such as are used for instance in wireless telegraphy and telephony comprise a number of oscillating circuits, working at least on two frequencies one of which is the high frequency of the transmitted waves and the other an audio frequency allowing the signals to be heard.

I have previously described, for instance in my British Patent No. 143,583 wireless receivers using not only the two above mentioned frequencies but also intermediary frequencies between the said frequencies whereby the current produced in the receiving circuit can be modulated either in amplitude or in frequency; this modulation at an intermediary frequency can be either impressed on the incoming waves themselves or be produced by beats with local auxiliary circuits. The latter arrangement using an intermediary frequency can constitute the superheterodyne method The use of such intermediary frequencies provides, as shown by me and as confirmed by practice, the elimination of all strays due chiefly to atmospheric disturbances.

The object of my invention is an improved method for eliminating the natural oscillations arising in receivers under the action of strays, even if small aerials are used.

Another object of my invention consists in novel means for producing the intermediary frequency.

Up till now the elimination of strays has been hindered by the following drawbacks.

The aerials receiving the waves must be large in order to absorb sufficient energy for actuating the receiver. Such large aerials also absorb considerable energy due to strays.

Now, the aerials are generally tuned to the frequency of the incoming waves or at the most are detuned with reference to it by a constant amount after a first tuning to it. This does not allow an easy selection of the two waves received under the same conditions by the antenna and produced one by the transmitting station and the other by the strays.

According to my invention I create a difference between the natural oscillations caused by the strays due to atmospheric disturbances for instance, and these forced by the waves transmitted by the transmitting station. This difference is based on the fact that the natural oscillations have always the same frequency as the receiving circuit whereas the forced oscillations have that of the transmitting station. My new method consists therefore in constantly varying, periodically or not, by means disclosed hereinafter, the natural period $f$ of the circuit. Thus the natural oscillations produced by atmospheric disturbances for instance will have a periodically varying frequency $f'$. On the contrary the forced oscillations due to the transmitted waves will have a constant frequency $f$; the variation of the natural period of the receiving circuit will only have for effect a periodic detuning the only result of which will be a periodic weakening to a small extent of the amplitude of these forced oscillations.

Thus a considerable difference will be created between the two kinds of oscillations; those due to strays will have a periodically changing frequency, that is they are modulated in frequency whereas those due to the transmitted waves keep a constant frequency with a periodically varying amplitude i. e. they are modulated in amplitude. It should be noted that these two above described modulations have the same frequency which is that of the variations of the tuning of the receiving circuit. This frequency F will be termed hereinafter the secondary frequency.

It is easy to separate the two oscillations. After detection the modulation in amplitude can easily appear in a circuit tuned to the secondary frequency F of this modulation whereas the strays will only produce in such a circuit very low frequency beats, as explained hereinbelow. The modulation in amplitude will, as also explained hereinbelow, be produced at a frequency F or 2F and can be either audible or not and in the latter case as high as may be desired.

The natural period of the receiving circuit can be modified at a secondary frequency F either by mechanical or electrical means. Mechanical means can only be used for low frequencies and can be adapted to vary, by suitable short circuits for instance, the self induction or capacity of the circuit. For higher secondary frequencies, it is necessary to use electric means such as for instance:

(a) Insertion in the receiving circuit, in shunt or in series, of resistances the value of which varies with the current passing through it (vacuum tubes for instance).

(b) Variation by electric means of the value of induction coils or condensers connected with the receiving circuit.

I have described hereinbelow and shown on appended drawings several embodiments of my invention, chosen by way of example.

Figs. 3 and 4 are explanatory diagrams relating to the variation of frequency.

Figs. 5 and 6 are diagrams showing the effects of strays before and after detection.

Fig. 7 shows the known arrangement of an electromagnetic telephone used as a detector.

Figure 1:
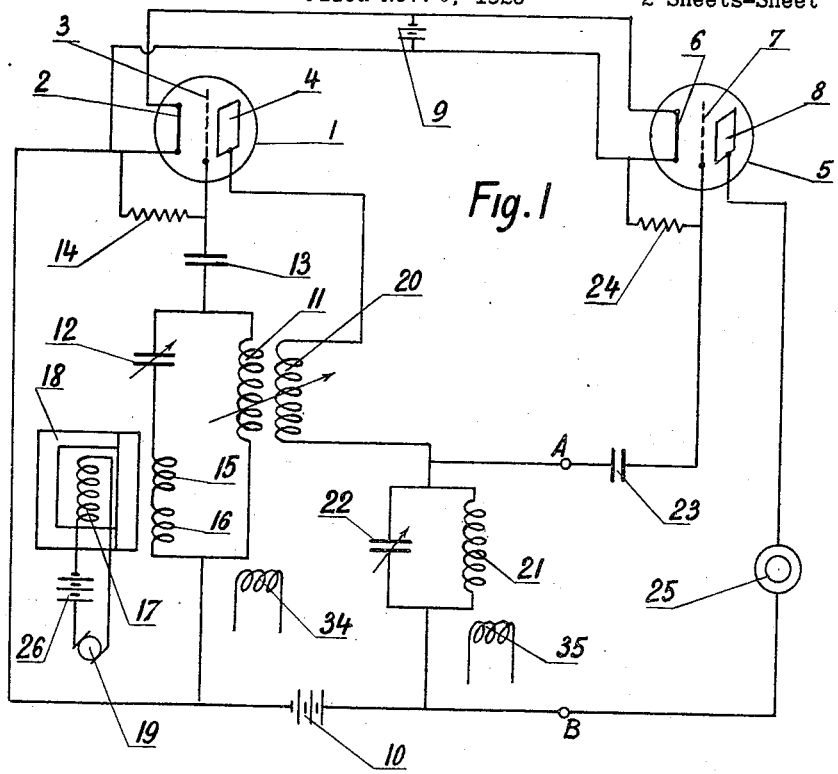
Fig. 1 is a diagram of an embodiment of the invention comprising a magnetic modulator.

On Fig. 1 are shown diagrammatically a first vacuum tube 1 with its filament 2, its grid 3 and its plate 4, a second tube 5 with its filament 6, its grid 7 and its plate 8.

The filaments of the two lamps are heated by the battery 9 and the plates are connected through the battery 10 with their filament.

The receiving circuit comprises in series an aerial A, a coil 11, a condenser 12 and two induction coils 15 and 16. The receiving circuit is connected through the condenser 13 to the grid 3 of the lamp 1. This grid is itself connected through the resistance 14 to one end of the filament, whereby the tube 1 is mounted in the known manner as a detecting tube.

The two induction coils 15 and 16 are wound in opposite directions around an iron core 18 forming a closed magnetic circuit. A third winding 17 is also wound around this core and its ends are connected to a battery 26 and to local oscillations generator 19 working at the secondary frequency F. This frequency is much lower than that of the transmitted waves. It may be for instance of 10,000 periods per second.

This generator 19 diagrammatically shown on Fig. 1 can be a mechanical device for sufficiently low frequencies. For higher frequencies one or more vacuum tubes should be used as generators.

In the plate circuit of the tube 1 are inserted the feed-back coil 20 inductively coupled with the coil 11 and the oscillating circuit 21, 22 tuned to a frequency 2F, double of that of the generator 19.

The oscillations of this circuit 21, 22 are detected by the vacuum tube 5 connected as a detector and provided with the grid condenser 23 and resistance 24.

In the plate circuit of the tube 5 is disposed the telephonic receiver 25.

The direct current fed by the battery 26 in the winding 17 produces in the core 18 a magnetic flux the value of which can be adjusted so that the increases or decreases of the flux under the action of the alternating current of frequency F produced by the generator 19 produce in the core 18 variations of its permeability; to the variations of the permeability correspond variations of the self induction of the coils 15 and 16 and thereby of the frequency $f'$ of the natural oscillations of the receiving circuit.

The device can be arranged in a manner such as will prevent the alternating current produced by 19 from having any effect on the coils 15 and 16 beyond this variation of permeability. This current produces in the core 18 a periodic magnetic flux having a given wave length. It is sufficient to dispose the coils 15 and 16 over the core 18 at a distance equal to this magnetic wave length for the fluxes passing through each of them to be in phase. Thereby and by reason of their opposite winding, the currents induced by them will always be opposed to each other and their resultant will be constantly zero.

On the other hand, due to the high frequency of the waves received by the receiving circuit, each coil 15 and 16 will induce in the core 18 a magnetic flux of very small wave length. The two fluxes being opposed will have a resultant equal to zero.

It is easy, by referring to Figs. 3 and 4, to understand how the incoming waves will be modulated in amplitude, on these figures, the abscissæ along OX give the times, the ordinates above the line OX the variable natural frequencies $f'$ of the receiving circuit and the ordinates below OX the amplitudes of the received waves.

The variations of $f'$ are shown by the curve I, a sinusoid for instance, and its period is that of the variations of frequency, that is $\frac{1}{F}$, its mean ordinate being equal to $fm$. If the receiving circuit is tuned in a manner such as will make this mean frequency $fm$ equal to the frequency $f$ of the incoming waves that is $f = fm$ the circuit will be detuned each time $f'$ is below or above its mean value $fm$ and the maximum by which it is out of tune is produced each time $f'$ passes through a maximum or a minimum. The amplitude of the received wave will be greater as the circuit is more in tune. This amplitude will thus pass.

(a) through a minimum, each time $f'$ passes through a maximum or a minimum.

(b) through a maximum, each time $f'$ passes through the value $fm = f$.

It can be seen by inspection of the figure that the curve II giving the amplitude will be periodical, its frequency being double that of the curve $f'$; or otherwise stated, in the present case, the frequency of the modulation in amplitude will be double the secondary frequency F.

On the contrary if the tuning is such as will make $f$ equal or superior to the maximum of $f'$ or else equal or inferior to the minimum of $f'$ as shown on Fig. 4, the maxima and minima of the amplitudes will correspond to those of the frequencies $f'$ and thereby in this second case the frequency of the modulation in amplitude will be equal to the secondary frequency F.

These properties do not presuppose that the curve giving $f'$ is a sinusoid. It is sufficient for this curve to be periodical, its frequency being F.

The tuning variations corresponding to the amplitude of the curve $f'$ can either go up to several thousand periods per second or go down below one period in which latter case it is a mere phase variation. If it is feared that the reception may be disturbed by stations working at a frequency near $f$, it is necessary to choose a very small amplitude for this tuning variation so as to be always sufficiently detuned with reference to the disturbing stations for not receiving the signals sent out by them.

Let us suppose first by way of example that we are in the first case i. e. of a frequency 2F for the modulations in amplitude. After detection of the waves received by the tube 1, the circuit 21—22 tuned to this frequency 2F will be submitted to a current of high frequency $f$ modulated at the frequency 2F and to the currents produced by the strays.

Each oscillating atmospheric discharge will cause in each receiving circuit 11—12 a series of wave trains each modulated in frequency and slowly damped as shown on Fig. 5. After detection by the tube 1 each damped wave train will diminish the mean plate current. This current passing through the circuit 21—22 can therefore be represented by the curve shown on Fig. 6. This curve is periodical and its frequency is very small. It is equal to the frequency of the several wave trains caused by the atmospheric disturbances, that is from about 15 to 20 per second.

This succession of shocks due to strays will have but little effect on the circuit 21—22 as explained hereinabove and experimentally proved by myself with superheterodyne apparatus; these allow like that shown on Fig. 1 but by different means, the modulation at a secondary frequency of the oscillations of the receiving circuit.

If the incoming waves are produced by a radiotelephonic station, the modulation at an audio frequency of the waves sent out by the transmitting station is transmitted to the currents of secondary frequency F or 2F passing through the circuit 21—22; after detection by the tube 5, the telephone reproduces these modulations at audio frequency.

In the case of radiotelegraphy, if the incoming waves are undamped and non-modulated, the coupling between the coils 11 and 20 allows the tube 1 to work as a generator and a slight detuning with reference to its tuning frequency of the circuit 11, 12, 15, 16 allows the production of beats at audio frequency by the autodyne method between the incoming waves and the local waves of variable frequency in the circuit 21—22.

Figure 2:
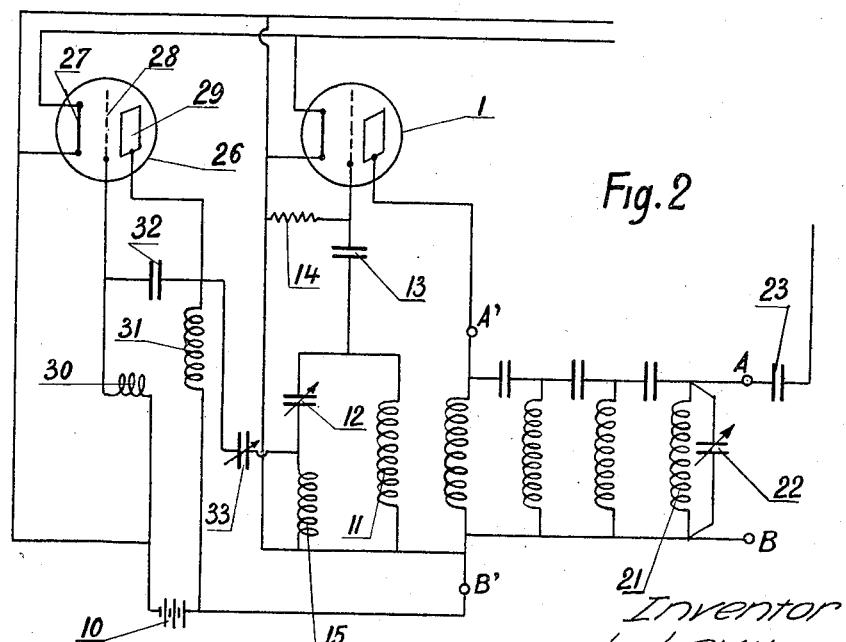
Fig. 2 is a diagram of another embodiment wherein the modulator is a vacuum tube.

Fig. 2 shows another modification of the invention wherein the variation of the natural frequency of the receiving circuit is produced by means of a vacuum tube 26 which acts simultaneously as a generator of current at superaudible frequency and as a modulator.

This vacuum tube 26 is provided with a filament 27, a grid 28 and a plate 29; it is mounted as a generator by means of the induction coils 30—31 and the condenser 32, the frequency of the oscillations produced being superaudible; a variable condenser 33 connects the plate of the tube 26 with the extremity of the coil 15 of the circuit 11, 12, 15 similar to that of the Figure 1 and in which is inserted an aerial A.

The plate-filament circuit of the tube 26 shunts the coil 15 and the varying resistance of this circuit produces variations in the natural frequency of the circuit 11, 12, 15, containing the aerial A. The working will thus be the same as in the case of Fig. 1.

On Fig. 2 is shown between A' B' and A B an artificial line constituted by a series of oscillating circuits and adapted to damp out the low frequency shocks. The detecting tube 5 is not shown as it is mounted exactly as shown in Fig. 1.

It can be seen that the circuit 21—22 of the Fig. 1 is traversed by currents the frequency of which is intermediate between that of the incoming waves and the audio-frequency received in the telephone as is the case in the intermediate frequency circuit of the superheterodyne arrangement; it is therefore easy to understand that the improvements already proposed for the superheterodyne receiver can be applied to the receiver disclosed in this specification. For instance selective or non-selective amplifiers can be disposed for each frequency; the number of frequencies being above two, the final amplification will be far higher than that provided by an ordinary apparatus using only the high frequency of the transmitted waves and the audio-frequency allowing the signals to be heard.

The circuit 21—22 can be replaced by an artificial line or by any other combination of oscillating circuits.

The known heterodyne, superheterodyne and superregenerating methods can be, if desired, used with the above-described receiver. For instance, the primary circuit 11, 12, 15, 16 can be submitted to the heterodyne method through the coil 34 (Fig. 1) coupled thereto and the secondary circuit 21—22 through the coil 35 coupled thereto.

It should be noted that the different steps constituting the method applied to my receiver can be repeated several times in the receiver. My improved receiver can be considered as a frequency changer and it is evident that between the original frequency $f$ and the audio-frequency actuating the telephone 25, instead of only one intermediary frequency a number of intermediary frequencies F, F$^1$, F$^2$, can be used produced either by the above described arrangements or by those used for applying the superheterodyne method. This will provide the advantage of a separate amplification at each intermediary frequency.

The changes of frequency can be also made some by the above described method and some by the superheterodyne method.

In the case of short waves the autodyne method can be used instead of the heterodyne method.

In the case of short waves, as is well known, very small changes in the frequency at the transmitting station can make the signals vanish at the receiving station. This is the case for instance for the receiving devices comprising circuits having a very great feedback such as the superregenerating arrangements. In those cases the above described method is of great interest as the natural frequency of the receiving circuit varies slightly on either side of a mean value. This provides for a sort of periodical exploration of a field of frequencies on either side of $fm$ and the correct tuning is passed through twice per period whereby the signals are received with certainty near these passages through the correct tuning frequency.

It should also be noted that the method can be applied in all cases where a circuit can be traversed by natural oscillations in view of preventing these oscillations to act on the following circuits. For instance, it can be applied to all oscillating circuits, artificial electric or magnetic lines, transmission wires using carrier waves etc.

Evidently, the variation of the natural frequency of the receiving circuit can follow any law and the curves I of Figs. 3 and 4 can be replaced by any desired curves. For instance the natural frequency of the receiving circuit (or circuits) can be changed suddenly; this can be done for instance by disposing a valve in the circuit of the generator 19 and of the winding 17.

An interesting improvement in the described method consists in replacing the secondary detector (tube 5 of Fig. 1) by an electromagnetic telephone which acts in the same manner.

This telephone (Fig. 7) comprises two windings; the stationary one 36 serves to vary the magnetic field wherein the coil 37 to which the vibrating diaphragm 38 is secured is adapted to move. Current is fed from the generator 19, for instance, into the stationary winding 36 and from the plate circuit of the tube 1 into the movable coil 37. The receiving circuit should be adjusted so as to make the frequency of the modulation in amplitude equal to the secondary frequency F and not to a multiple thereof. The two circuits are thus fed by two currents of the same frequency showing a difference of phase. The variations of amplitude due to the modulation of the transmitted waves will cause corresponding movements of the vibrating plate.

In the case of telegraphic stations the current fed by the modulator is replaced by that of a generator 19 working at an audio-frequency much superior however to that of the current due to the strays (Fig. 6).

In the case of very small tuning variations (phase variations for instance) the current of secondary frequency may act on the local current of the modulator or of the heterodyne generator in a radio goniometer.

What I claim is:

1. A stray proof radio receiver comprising a receiving circuit, means for varying automatically in a continuous manner according to a predetermined periodical law the natural period of said receiving circuit with reference to the period of the incoming waves, means adapted to substantially quench the natural oscillations at varying frequency transmitted by the receiving circuit and to allow the forced oscillations thereof at the frequency of the incoming waves to pass and means for detecting said forced oscillations.

2. A stray-proof radio receiver comprising a receiving circuit, means for varying automatically in a continuous manner according to a predetermined periodical law the natural period of said receiving circuit with reference to the period of the incoming waves, detecting means adapted to receive the current from the receiving circuit, an oscillating circuit fed by the detecting means and tuned to a frequency which is in a simple ratio with that of the variations of the natural period of the receiving circuit, second detecting means fed by the oscillating circuit and a receiver proper fed by said second detecting means.

3. A stray proof radio receiver comprising a receiving circuit, a generator of oscillations inserted in shunt with part of the receiving circuit and causing the natural period thereof to vary automatically in a continuous manner according to a predetermined periodical law with reference to the period of the incoming waves, means adapted to substantially quench the natural oscillations at varying frequency transmitted by the receiving circuit and to allow the forced oscillations thereof at the frequency of the incoming waves to pass and means for detecting said forced oscillations.

4. A stray proof radio receiver comprising a receiving circuit, means for varying automatically in a continuous manner according to a predetermined periodical law the natural period of said receiving circuit with reference to the period of the incoming waves, the super-audible period of the variation of the natural period being much lower than that of the incoming waves, means adapted to substantially quench the natural oscillations at varying frequency transmitted by the receiving circuit and to allow the forced oscillations thereof at the frequency of the incoming waves to pass and means for detecting said forced oscillations.

5. A stray proof radio receiver as claimed in claim 1 comprising a number of circuits at intermediary frequencies between that of the incoming waves and audio frequency, means for producing some of these intermediary frequencies by a continuous periodical variation of the higher frequency, detecting means applied to said higher frequency, and means for producing the remaining intermediary frequencies through a frequency changer.

6. A stray-proof radio receiver comprising a receiving circuit, means for varying automatically in a continuous manner according to a predetermined periodical law the natural period of said receiving circuit with reference to the period of the incoming waves, detecting means adapted to receive the current from the receiving circuit, an oscillating circuit fed by the detecting means and tuned to a frequency which is equal to that of the variations of the natural period of the receiving circuit, second detecting means fed by the oscillating circuit and a receiver proper constituted by an electromagnetic telephone one winding of which is fed by the said oscillating circuit and the other by a current having the same period as the variations of frequency in the receiving circuit.

In testimony whereof I have signed my name to this specification.

LUCIEN LEVY.